United States Patent [19]
Schneider

[11] 3,933,792  
[45] *Jan. 20, 1976

[54] PLATE AND FRAME TYPE FILTERING APPARATUS

[76] Inventor: John R. Schneider, 26 Cove Road, Belvedere, Calif. 94920

[ * ] Notice: The portion of the term of this patent subsequent to Nov. 26, 1991, has been disclaimed.

[22] Filed: Nov. 4, 1974

[21] Appl. No.: 520,233

Related U.S. Application Data
[63] Continuation-in-part of Ser. No. 282,070, Aug. 21, 1972, Pat. No. 3,850,812.

[52] U.S. Cl. .............................................. 210/231  
[51] Int. Cl.² ........................................ B01D 25/12  
[58] Field of Search .......... 210/227, 228, 229, 230, 210/231, 402, 404

[56] References Cited
UNITED STATES PATENTS

| | | | |
|---|---|---|---|
| 620,716 | 3/1899 | Montgomene | 210/227 |
| 3,306,457 | 2/1967 | Putnam | 210/404 X |
| 3,386,584 | 6/1968 | Luthi | 210/404 |
| 3,499,532 | 3/1970 | Schneider | 210/229 X |
| 3,543,938 | 12/1970 | Busse et al. | 210/231 |
| 3,669,267 | 6/1972 | Huttm | 210/231 |
| 3,680,708 | 8/1972 | Luthi | 210/404 |
| 3,837,499 | 9/1974 | Luthi | 210/404 |
| 3,850,812 | 11/1974 | Schneider | 210/231 |

Primary Examiner—Theodore A. Granger  
Attorney, Agent, or Firm—Owen, Wickersham & Erickson

[57] ABSTRACT

A filtering apparatus comprises a plurality of plate and frame sections arranged adjacent each other in alternating sequence with a layer of filter media retained between each pair. Both plate and frame sections have peripheral members with openings which provide access to the inner space formed within the members. Peripheral conduit means on each frame section serve to distribute the liquid to be filtered in a way that does not disturb the filter media or any collected dirt on it as the liquid flows through the filter media and into the inner space of each plate member where it accumulates and passed out through an outlet conduit.

5 Claims, 13 Drawing Figures

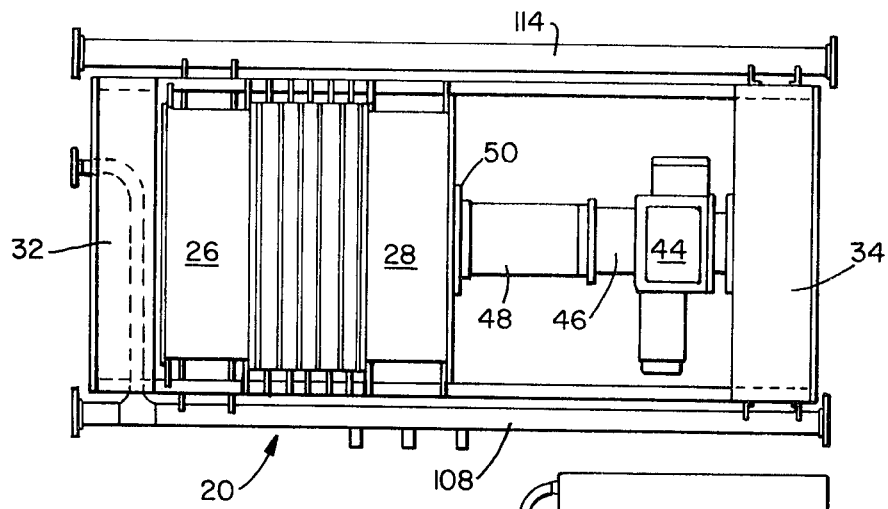
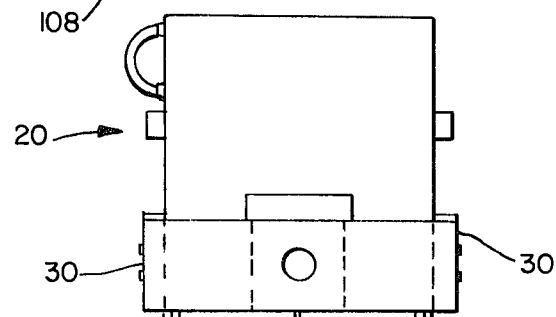
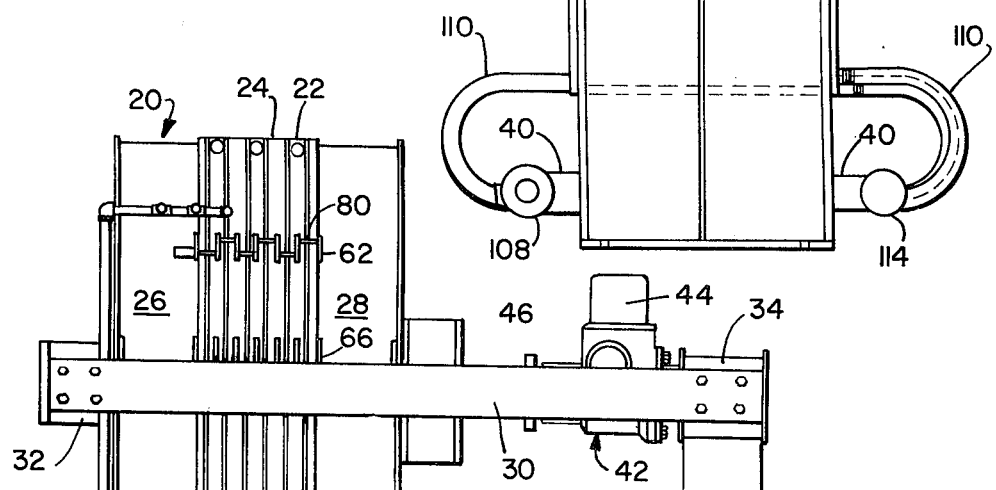
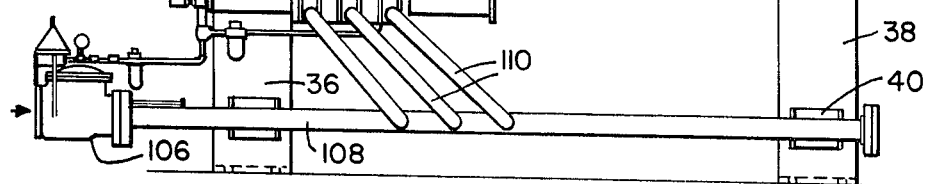

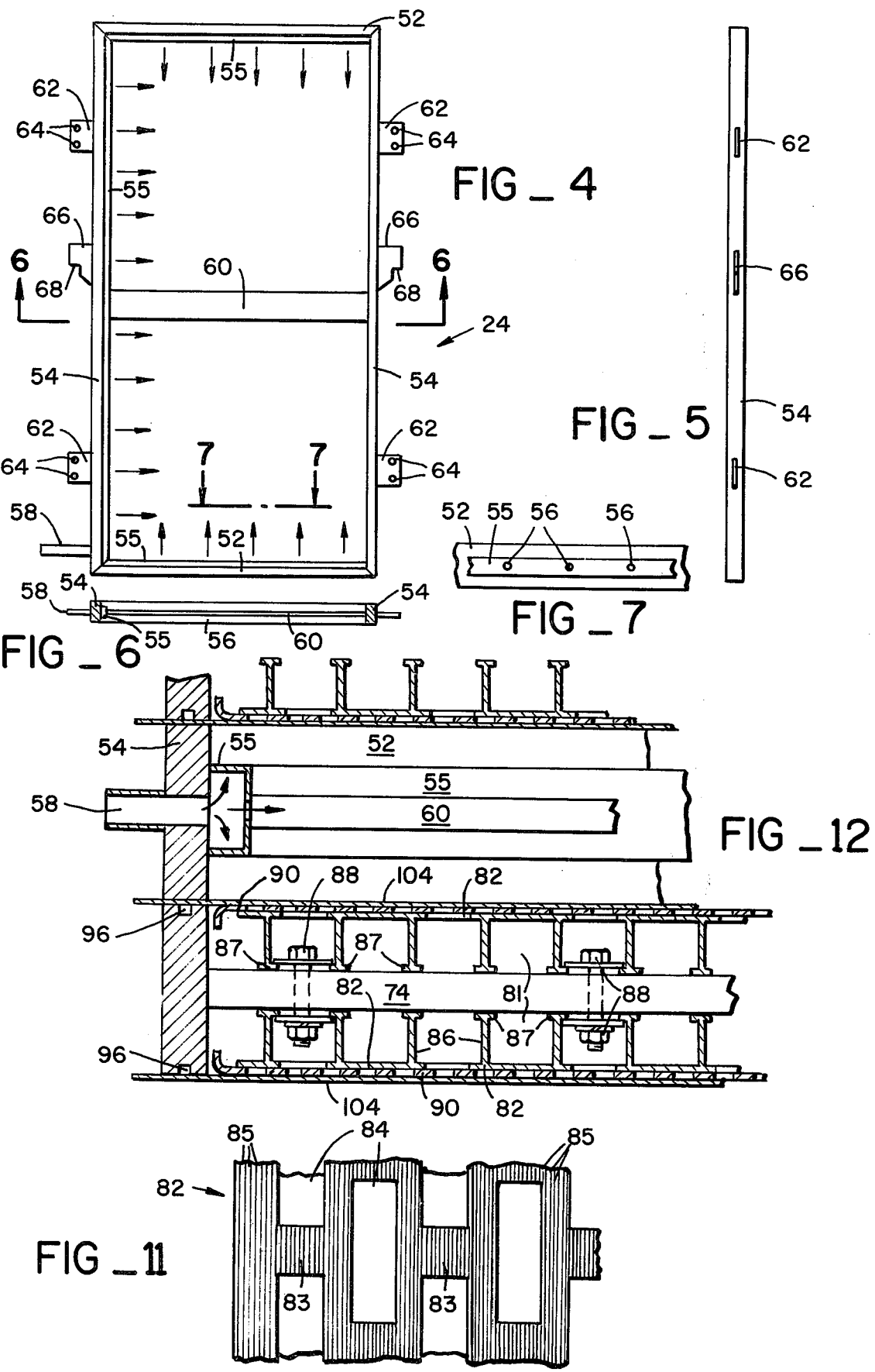

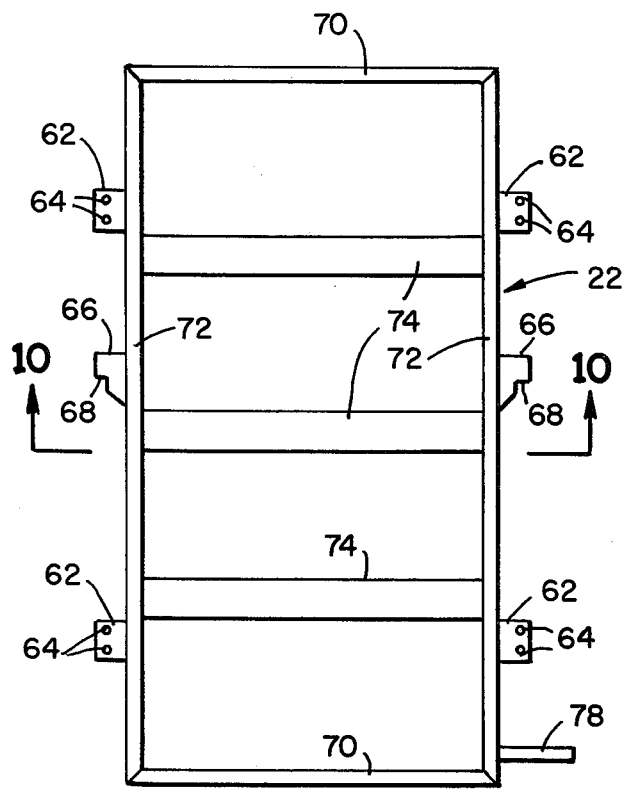
FIG_8
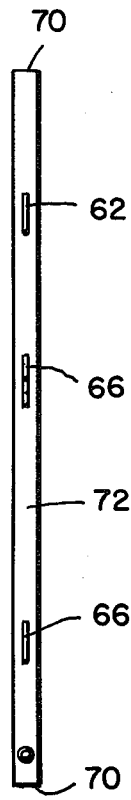
FIG_9
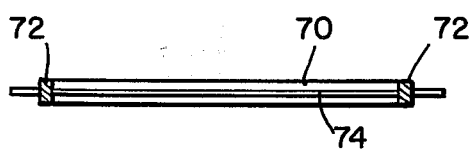
FIG_10

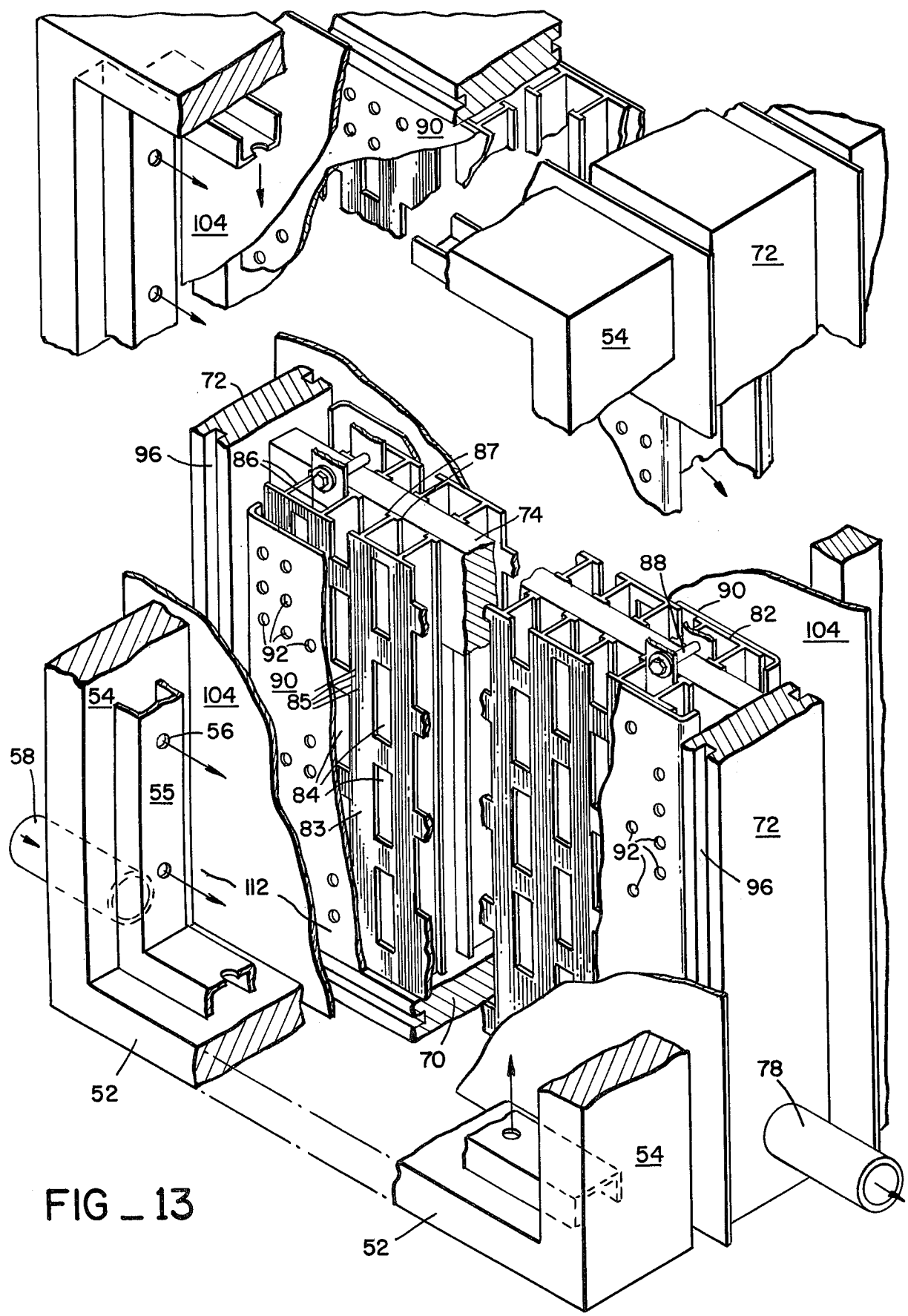
FIG_13

PLATE AND FRAME TYPE FILTERING APPARATUS

BACKGROUND OF THE INVENTION

This is a continuation-in-part of application Ser. No. 282,070, filed Aug. 21, 1972 now U.S. Pat. No. 3,850,812.

This invention relates to liquid filtering apparatus, and more particularly it relates to an improved high capacity fine filtering apparatus.

In the field of filtration, so-called plate and frame filters have long been used for applications where large volumes of fluid must be accommodated. Essentially, the plate and frame sections are arranged in an alternating order with some form of filter media retained between them. The fluid to be filtered is then introduced in a parallel distribution to areas on one side of the filter media. When the fluid is forced through the media to areas on the other side of the media it is directed through outlets also connected in parallel to a conduit. Heretofore, both the plate and frame sections of such filtration apparatus were constructed as machined metal castings. These sections were relatively heavy, intricate in shape and design and consequently expensive to produce. Moreover, this construction resulted in a filter apparatus which was usually quite heavy, making it difficult to install and requiring considerable power to open and close the plate and frame sections.

Another disadvantage of the aforesaid prior art plate and frame sections was that when assembled in their operating position the inflow of fluid to be filtered was at one point in the receiving chamber on one side of each frame section. This often caused an inflow turbulence that disturbed and adversely affected the filter media, thereby reducing filtering efficiency.

SUMMARY OF THE INVENTION

In accordance with the present invention, a filtering apparatus is provided comprising a series of plate and frame sections having a novel construction and mounted together in a parallel, alternating arrangement. These sections are supported on a suitable base structure and connected to a controllable mechanism which can separate the members to facilitate the installation and removal of filter media and then compress and hold the sections together as the filtering process takes place. Each plate and frame section is comprised of a continuous peripheral member of formed and end welded metal plate portions and is provided with an external access fitting. Each frame section additionally comprises a U-shaped channel fixed interiorly to the continuous member and forming a peripheral cavity on at least three sides thereof. On the inner edge of this peripheral channel are a series of spaced apart internal openings through which fluid can pass. Thus, when liquid to be filtered is supplied to the frame sections it fills the peripheral channels and is then forced through the series of internal openings in relatively small streams into the space surrounded by the peripheral member.

To the opposite sides of the plate sections are fixed a pair of rigid metal grating plates. Each grating plate has a face portion containing spaced apart openings and parallel serrated grooves between the openings. Plural evenly spaced apart reinforcing rib portions extend inwardly from the face portion so that the grating plate can withstand considerable internal pressure without substantial bending. Covering the rigid grating plates on the face side thereof which is adjacent a frame section is a screen member which may be a continuous perforated plate having about one half of its surface area open. Thus, with a layer of filter media installed over the screen member a fluid path is provided into the space within the peripheral member of each frame section, through the filter media, through the screen, through the openings of the grating plate and into the central space of a plate section where it then passes into the outlet conduit.

Accordingly, it is a general object of the present invention to provide an improved filtering apparatus that overcomes the aforesaid problems and disadvantages and provides both a high capacity with a fine filtering capability.

Another object of the present invention is to provide an improved filtering apparatus of the so-called plate and frame type that is particularly well adapted for ease and economy of construction.

Another object of the present invention is to provide an improved filtering apparatus that does not require any intricate, heavy and expensive castings for the plate and frame sections.

Another object of the present invention is to provide an improved filtering apparatus wherein each plate and frame section includes a continuous peripheral member with an externally accessible opening, so that series of plate and frame sections can be readily connected in parallel to fluid input and outflow conduits.

Another object of the present invention is to provide a filtering apparatus of the plate and frame type wherein liquid to be filtered is supplied to a peripheral cavity of each frame member and then to the area adjacent the filter media with little or no turbulence, thereby avoiding any appreciable disturbance of the media and increasing filtering efficiency.

Yet another object of the present invention is to provide a filtering apparatus of the plate and frame type that is easy to clean, maintain and change filter media without the need for special tools and highly skilled labor.

Other objects, advantages and features of my invention will become apparent from the following detailed description of one embodiment that is presented with the accompanying drawing:

BRIEF DESCRIPTION OF THE DRAWING

FIG. 1 is a view in side elevation of a filter embodying the principles of the present invention;

FIG. 2 is a view in end elevation of the filter of FIG. 1;

FIG. 3 is a top view of the filter of FIG. 1;

FIG. 4 is a view in front elevation of a frame section for the filter of FIG. 1 wherein arrows depict diagrammatically the direction of fluid flow;

FIG. 5 is a view in side elevation of the frame section of FIG. 4;

FIG. 6 is a view in section taken along line 6—6 of FIG. 4;

FIG. 7 is a view in section taken along line 7—7 of FIG. 4;

FIG. 8 is a front view in elevation showing the peripheral member portion of a plate section for the filter apparatus of FIG. 1;

FIG. 9 is a side view in elevation of the plate section of FIG. 8;

FIG. 10 is a view in section taken along line 10—10 of FIG. 8;

FIG. 11 is a fragmentary view in elevation showing the face of the grating plate portion of a plate section for the filter apparatus of FIG. 1;

FIG. 12 is a fragmentary top plan view in section of the adjacent plate and frame filter sections for the filter apparatus of FIG. 1; and FIG. 13 is a fragmentary view in perspective showing the liquid path through adjacent plate and frame filter sections according to the present invention.

DESCRIPTION OF A PREFERRED EMBODIMENT

With reference to the drawing, FIGS. 1–3 show a plate and frame filter 20 embodying the principles of the present invention and particularly adaptable for removing particulate matter and other deleterious material from liquids in various industrial and manufacturing operations. In general, it comprises a number of plate and frame sections 22 and 24 which in the embodiment shown, are mounted in an upright position in an alternating order between fixed and movable platens 26 and 28 which serve to hold them tightly together when the filter is in operation and to separate them a predetermined amount when the filter is to be cleaned and new filter media supplied. The plate and frame sections are supported on a pair of spaced apart, horizontal frame members 30, which are connected at opposite ends by a pair of cross members 32 and 34. Fixed to the cross member 32 at one end of the filter is one platen 26 which is also supported on its lower side by a short upright support member 36 that extends upwardly from the floor. At the other end of the filter are a pair of vertical frame members 38 that are fastened to the cross member 34 at their upper ends and to another cross member 40 at their lower ends. Mounted at the center of the cross member 34 is a jacking mechanism 42 which controls the horizontal positioning of the movable platen 28 and thus the separation and closing of the plate and frame sections 22 and 24. Any suitable jacking mechanism may be used which produces the desired linear movement. A convenient arrangement, as shown in FIGS. 1 and 3, comprises a motor 44 connected to a gear drive 46 whose output drives a linearly movable jack screw 48. The latter is connected by means of a plate 50 to the movable platen 28.

The fixed and movable platens are each connected to one plate section 22, which is connected to a frame section 24 so that all of the plate and frame sections are connected together in an alternating stacked arrangement.

The construction of both the plate 22 and frame 24 sections represents a significant departure from the prior art that provides new and advantageous results. In general, both plate and frame sections have peripheral members which may be of metal plate portions joined at each corner as by welding so as to form continuous members. In addition, the frame sections 24 have U-shaped channels fixed interiorly to three side portions of the peripheral members, thereby providing a distribution of fluid that increases filtering efficiency as shown by arrows in FIG. 4. Within each peripheral member a space is formed that collects fluid before it is filtered in each frame section and collects filtered fluid within each plate section.

As shown in the embodiment of FIGS. 4, 5, 6 and 7 each frame section 24 is comprised of a series of top and bottom end portions 52 and side portions 54, all formed of flat metal plate members that are connected together at their ends, as by welding, to form a continuous peripheral member. The metal plate used for this peripheral member preferably has a square or rectangular cross section and is formed from some strong, durable metal, such as steel. On the inner surfaces of these connected portions is joined a U-shaped channel 55 defining a continuous conduit which extends along the top and bottom end portions 52 and one interconnecting side portion 54. The channel may be secured to the adjacent portions by welding. In the channel 55 are a series of spaced apart holes 56 and fixed at one lower corner is a horizontally extending inlet fitting or nipple 58. A horizontal cross bracing member 60 may be connected to the side sections 54 to provide internal strength. Fixed to and extending outwardly from opposite side sections of each frame member 24 are upper and lower pairs of connecting lugs 62, each with a pair of holes 64. Located between each upper and lower pair of such lugs is another outwardly extending guide member 66 having a notched out shoulder 68. These guide members on opposite sides of the frame section 24 rest on the horizontal frame support members 30 and thereby support the section in the upright position.

Referring now to FIGS. 8, 9 and 10, each plate section 22 of my filter 20 is also comprised of upper and lower end portions 70 connected at their ends to parallel, spaced apart side portions 72 to form a peripheral member. All such peripheral portions are of metal plate material cut into strips having preferably a square or rectangular cross section as with the frame sections 24. As shown in FIG. 8 the side portions 72 may be interconnected by a series of spaced apart horizontal members 74 of metal plate material which are mounted parallel to the side portions 72 and peripendicular to the end portions 70 as shown in FIG. 10. The horizontal members provide internal strengthening and may serve to secure the filter media support members described hereinafter. Each plate section 22 is also provided with outwardly extending pairs of connecting lugs 62 and guide members 66 all having the same shape, size and location of those similar members on each frame section. An outlet fitting or nipple 78 is provided near a lower end of one of the side portions 72 of each plate section. When the plate and frame sections are arranged in alternating order on the filter support structure, the guide members rest with their shoulders 68 on the support members 30 and the sections are connected by bolts 80 that extend through the holes 64 of the lugs 62. The bolts are long enough to permit a predetermined amount of separation between plate and frame sections when the jacking mechanism is actuated to separate the platens.

Now, fixed within a chamber 81 formed by the connected peripheral portions of each plate section 22 are a pair of media support grating plates 82. Each plate 82 has a face portion 83 characterized by spaced apart openings 84 and parallel vertical serrated grooves 85 extending thereover except for the openings 84. Plural parallel spaced apart ribs 86 extend inwardly from the face portion and vertically for the length of each grating plate 82. A double flanged lip 87 is formed along the length of each reinforcing rib 86 at the inner end thereof. The grating plates 82 are preferably made of a strong rigid material such as a structural aluminum alloy, and they may be fabricated by well known extrusion and punching processes. In practice, I have found that Ariston Aluminum Plank Grating Model No PR extruded from Aluminum Alloy 6063T6, and made by Associated Ironworkers, South San Francisco, Calif. functions well as the grating plate 82 of the plate section 22. The overall dimensions of each grating plate 82 is such that the edges thereof fit adjacently within an inner edge portion of each end and side portion forming the peripheral member. The plates 82 may be secured to the internal support members 74 by suitable fastener means, such as bolts and nuts and washers 88 which engage the adjacent lips 87 and bind them to the members 74 as shown in FIG. 12. On the outer surface 83 of each support plate are a series of holes 84 that are spaced apart and aligned vertically and horizontally along lines at alternate levels as shown in FIG. 11. Covering the face of each of the support plates 82 in the present embodiment is a screen member 90 which may be comprised of a sheet of material having a multiplicity of evenly spaced apart holes 92 such that about half of the area of the screen is open. In combination with the screen 90, the serrated grooves 85 in the face of the support plate 82 form a series of vertical, parallel fluid passages, adapted to conduct fluid to the openings 84 in the support plate. Thus, fluid passing through the filter media can flow through the screen member 90 and through adjacent openings 84, or through the screen and down the grooves 85 and then through openings 84, as the case may be, and thence into the chamber 81.

A sealing groove 96 is formed in opposite sides of the end and side portions 70 and 72 of each plate section. Each groove 96 extends completely around each plate section and provides a continuous sealing air passage between adjacent plate and frame sections. Air pressure supplied to these air passages assures that no fluid will leak out between plates and frame sections during the filtering operation.

The operation of the filtering apparatus 20 according to the present invention can be well understood by reference to FIGS. 1–3 and also to FIG. 13. With the plate and frame sections extended apart, sheets of filter media 104 are placed between them so that each such sheet is extended across and is adjacent to a screen member 90. When filtering of a fluid is to commence, the plate and frame sections are moved together in an accordian-like manner by actuation of the motor 44 which turns the jack screw 48 and moves the movable platen 28 toward the fixed platen 26. When the plate and frame sections are pressed tightly together the continuous groove portions 96 form a fluid tight seal between each pair of adjacent sections. Now, the liquid to be filtered is admitted through a valve 106 in a conduit 108 having a series of flexible hoses 110 connected in parallel to a series of inlet fittings 58 for the frame sections 28 of the filter. In FIG. 13, the path of the liquid as it flows through one set of plate and frame sections is shown. As the liquid enters the inlet fitting 58 it commences to fill the peripheral cavity of the frame section 22 formed by the U-shaped channel 55 and adjacent peripheral members 52 and 54 to which it is interiorly joined. As this cavity fills, the liquid flows through the openings 56 into the space 112 formed within the peripheral portions and between layers of filter media 104.

The pressure of the incoming liquid forces it through the sheet media which filters out any suspended particles or deleterious material. Clean liquid thus passes through the filter media, through the screen member 90, into the grooves 85, and through the openings 84 into the chamber 81 surrounded by the peripheral members 70 and 72 of the plate section 26. As the chamber fills clean liquid flows out of the outlet fitting 78 of the plate section into an outlet conduit 114 via a flexible hose 110.

Thus, it is seen that the filtering apparatus provides a relatively large amount of filtering area with an efficient flow path for the liquid through the media. The apparatus can readily utilize various types of media for filtering a wide variety of liquids and the media can be quickly removed and replaced when required. Since the incoming liquid is initially supplied to the peripheral cavity of the frame member and then forced through a large number of the openings which are small, the incoming flow of liquid into the chamber adjacent the filter media is not concentrated in a large stream and consequently cannot disturb the filter media or any collected dirt on it. This is an important factor that increases filtering efficiency in the filter apparatus 20 and allows operation at relatively high liquid pressure levels and flow rates.

The construction of the plate and frame sections as described can be accomplished using conventional metal fabrication techniques. Thus, the use of peripheral portions of cut metal plate and U-shaped channels to form peripheral cavities for the frame sections, while unique in structure and function, also provides an overall cost advantage over the heavy, complicated cast sections heretofore used in plate and frame filters.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A liquid filtering apparatus comprising:
a plurality of plate and frame sections arranged in an alternating sequence;
means for supporting said sections in a generally upright vertical position;
linking means for connecting said sections together while allowing them to be separated a predetermined amount to facilitate the insertion of filter media between adjacent plate and frame sections;
controllable actuator means for pressing said sections together when filtering is being accomplished and for separating the sections when filter media is being changed;
an inlet conduit for supplying liquid to be filtered and means for connecting it in parallel to said frame sections;
an outlet conduit for removing filtered liquid connected in parallel to said plate sections;
all of said plate and said frame sections having peripheral members surrounding a central space, said members being formed by solid structure having a generally rectangular cross-section and connected together at their ends in a rectangular frame-like configuration;
base means in each plate section for supporting a layer of filter media;
all of said frame sections having hollow peripheral cavities within said central space with openings spaced along the inner surfaces of said cavities communicating with said central space;

said hollow peripheral cavities of said frame sections being formed by channel structure having a generally U-shaped cross-section joined at the open end thereof to the interior surfaces of said peripheral members and extending along substantially three sides of said peripheral members;

said inlet conduit communicating with a fluid conduit defined by the interior of said frame section channel structure in combination with the interior surfaces said peripheral members enclosed thereby;

said outlet conduit communicating with the central space defined by said plate section peripheral member.

2. The liquid filtering apparatus of claim 1 and including screen means within said peripheral member and covering each base means and having not less than substantially fifty percent open area.

3. The liquid filtering apparatus of claim 2 wherein said base means for supporting a layer of filter media comprises a pair of rigid grating plates fixed at opposite sides of each said plate section to substantially enclose said central space in each said central space in each said plate section, each said plate having a face portion having spaced apart openings and a series of longitudinal grooves which comprise the passages through said base means whereby filtered liquid may pass from said filter media into said central space in each plate section.

4. The liquid filtering apparatus of claim 3 wherein each grating plate is of extruded aluminum and has spaced apart longitudinal reinforcing ribs extending inwardly from said face portion.

5. The liquid filtering apparatus of claim 1 including a sealing groove in the sidewalls of the peripheral member of each said plate section and surrounding said base means and said screen means, and adapted to provide a passage for air used to maintain a peripheral seal between said plate and frame sections.

* * * * *